(12) United States Patent
Iwata et al.

(10) Patent No.: US 12,384,090 B2
(45) Date of Patent: Aug. 12, 2025

(54) EXTRUSION MOLDING DIE AND EXTRUSION MOLDING MACHINE

(71) Applicant: NGK INSULATORS, LTD., Nagoya (JP)

(72) Inventors: Kosuke Iwata, Ichinomiya (JP); Ryuji Yamaguchi, Nagoya (JP); Yuichi Tajima, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 502 days.

(21) Appl. No.: 17/447,703

(22) Filed: Sep. 15, 2021

(65) Prior Publication Data

US 2022/0219368 A1 Jul. 14, 2022

(30) Foreign Application Priority Data

Jan. 8, 2021 (JP) ................................ 2021-002325

(51) Int. Cl.
*B29C 48/31* (2019.01)
*B29C 48/07* (2019.01)
*B29K 509/02* (2006.01)
*B29L 7/00* (2006.01)

(52) U.S. Cl.
CPC ............ *B29C 48/313* (2019.02); *B29C 48/07* (2019.02); *B29K 2509/02* (2013.01); *B29L 2007/00* (2013.01)

(58) Field of Classification Search
CPC ... B29C 48/313; B29C 48/305; B29C 48/302; B29C 48/31
See application file for complete search history.

(56) References Cited

U.S. PATENT DOCUMENTS

| | | | | |
|---|---|---|---|---|
| 3,860,383 A | * | 1/1975 | Sirevicius | ............... B29C 48/08 425/461 |
| 4,217,322 A | * | 8/1980 | Sugano | ................... B29C 48/31 425/133.5 |
| 4,285,655 A | * | 8/1981 | Matsubara | ............ B29C 48/305 425/461 |
| 4,372,739 A | * | 2/1983 | Vetter | ..................... B29C 48/31 425/467 |

(Continued)

FOREIGN PATENT DOCUMENTS

| | | |
|---|---|---|
| CN | 102312297 A | 1/2012 |
| CN | 102791386 A | 11/2012 |

(Continued)

OTHER PUBLICATIONS

Tadashi Itoh, "Flow in Flat Die, Part 1: Fishtail Dies," *Polymer Chemistry*, 1963, vol. 20, No. 216, pp. 193-200.

(Continued)

*Primary Examiner* — Seyed Masoud Malekzadeh
(74) *Attorney, Agent, or Firm* — BURR PATENT LAW, PLLC

(57) ABSTRACT

An extrusion molding die includes a pair of die bodies, the die bodies have: a pair of lip portions arranged so as to face each other to form a slit port; and a pair of introduction portions arranged so as to face each other to form an introduction port. One die body is a coat hanger die having at least one thickness adjustment mechanism, and the other die body is a fishtail die.

10 Claims, 5 Drawing Sheets

(56) References Cited

U.S. PATENT DOCUMENTS

| | | | | |
|---|---|---|---|---|
| 4,753,587 A * | 6/1988 | Djordjevic | ............ | B29C 48/313 425/141 |
| 4,780,258 A * | 10/1988 | Cloeren | .................. | B29C 48/08 264/37.32 |
| 4,880,370 A | 11/1989 | Krumm | | |
| 5,234,330 A * | 8/1993 | Billow | .................. | B05C 5/0254 425/467 |
| 5,256,052 A * | 10/1993 | Cloeren | .................. | B29C 48/07 425/467 |
| 5,494,429 A * | 2/1996 | Wilson | .................. | B29C 48/305 425/133.5 |
| 5,740,963 A * | 4/1998 | Riney | .................... | B05B 7/025 239/597 |
| 6,057,000 A * | 5/2000 | Cai | ...................... | G03G 5/0525 118/410 |
| 6,926,512 B2 * | 8/2005 | Wu | ........................ | B29C 48/313 425/465 |
| 7,700,018 B2 * | 4/2010 | Lavoie | .................... | B29C 48/40 429/231.95 |
| 7,862,755 B2 * | 1/2011 | Elgindi | ................. | B29C 48/305 425/133.5 |
| 8,123,511 B2 * | 2/2012 | Cloeren | .................. | B29C 48/07 425/461 |
| 8,702,414 B1 * | 4/2014 | Pitsch | .................... | B29C 48/08 425/150 |
| 8,858,211 B2 * | 10/2014 | Fraley | .................. | B05C 5/0254 425/192 R |
| 9,067,351 B2 * | 6/2015 | Cloeren | ................ | B29C 48/695 |
| 10,030,321 B1 * | 7/2018 | Tao | ........................ | B29C 48/70 |
| 10,493,565 B2 * | 12/2019 | Honma | .............. | C23C 18/1637 |
| 2003/0215710 A1 * | 11/2003 | Lavoie | ................ | B32B 37/1054 264/105 |
| 2004/0130061 A1 * | 7/2004 | Lavoie | ................ | H01M 4/5825 264/211.21 |
| 2004/0238995 A1 * | 12/2004 | Ulcej | .................. | B29C 48/2556 425/461 |
| 2008/0274222 A1 * | 11/2008 | Cloeren | .................. | B29C 48/08 425/133.5 |
| 2009/0072434 A1 * | 3/2009 | Takita | .................... | B29C 55/023 425/133.5 |
| 2009/0206510 A1 * | 8/2009 | Rasmussen | ............. | B29C 48/08 425/133.5 |
| 2012/0027942 A1 * | 2/2012 | Joos | ...................... | B29C 48/155 222/1 |
| 2012/0196045 A1 * | 8/2012 | Fraley | ...................... | B05D 7/52 118/313 |
| 2015/0118462 A1 * | 4/2015 | Hwang | .................. | B29C 48/21 425/133.5 |
| 2018/0036931 A1 * | 2/2018 | Higuchi | ................ | C08F 214/18 |

FOREIGN PATENT DOCUMENTS

| | | |
|---|---|---|
| CN | 205915653 U | 2/2017 |
| DE | 30 19 280 A1 | 12/1981 |
| EP | 0 943 414 A1 | 9/1999 |
| JP | H06-134731 A | 5/1994 |
| JP | 2000-006227 A | 1/2000 |
| JP | 2007-160627 A | 6/2007 |
| JP | 2010-030238 A | 2/2010 |
| JP | 5204147 B2 | 6/2013 |
| TW | I698469 B | 7/2020 |

OTHER PUBLICATIONS

German Office Action (with English translation) dated Apr. 29, 2022 (Application No. 10 2021 210 735.4).
Chinese Office Action (Application No. 110128833) dated Nov. 16, 2022 (4 pages).
AS Chinese Office Action (Application No. 202111067285.7) dated Nov. 23, 2023 (7 pages).

* cited by examiner

EXTRUSION MOLDING DIE AND EXTRUSION MOLDING MACHINE

FIELD OF THE INVENTION

The present invention relates to an extrusion molding die and an extrusion molding machine.

BACKGROUND OF THE INVENTION

When a molding material is molded into a sheet shape using an extrusion molding machine, a flat die (hereinafter referred to as a "die") is provided at a discharge port of the extrusion molding machine. The die generally includes a pair of die bodies having: a pair of lip ports arranged so as to face each other to form a slit port; and a pair of introduction portions arranged so as to face each other to form an introduction port. The molding material extruded through the extrusion molding machine is introduced into the interior of the die through the introduction port and passes through the slit port to be molded into a sheet shape.

As a type of die body, a coat hanger die having a manifold portion is widely used. As used herein, the term "coat hanger die" is a concept that includes T-dies. Also known is a coat hanger die having a mechanism to control a width of a slit portion in a short direction (e.g., Patent Literature 1).

A fishtail die is also used as a die body (Non-Patent Literature 1). Although the fishtail die is not as widely used as the coat hanger die, it is used for molding resin materials having low thermal stability. However, there is no fishtail die having a mechanism to control the width of the slit port in the short direction at present.

In addition, these die bodies are used in a pair of two die bodies of the same type.

CITATION LIST

Patent Literatures

[Patent Literature 1] Japanese Patent No. 5204147B

Non-Patent Literature

[Non-Patent Literature] Tadashi ITOH, "Flow in Flat Die, Part 1: Fishtail Dies", Polymer Chemistry, Vol. 20, No. 216, pp. 193-200, 1963

SUMMARY OF THE INVENTION

The present invention relates to an extrusion molding die comprising a pair of die bodies, the die bodies having: a pair of lip portions arranged so as to face each other to form a slit port; and a pair of introduction portions arranged so as to face each other to form an introduction port;
wherein one of the die bodies is a coat hanger die having at least one thickness adjustment mechanism, and the other of the die bodies is a fishtail die.

The present invention also relates to an extrusion molding machine comprising the extrusion molding die as described above.

DETAILED DESCRIPTION OF THE INVENTION

Figure 1:
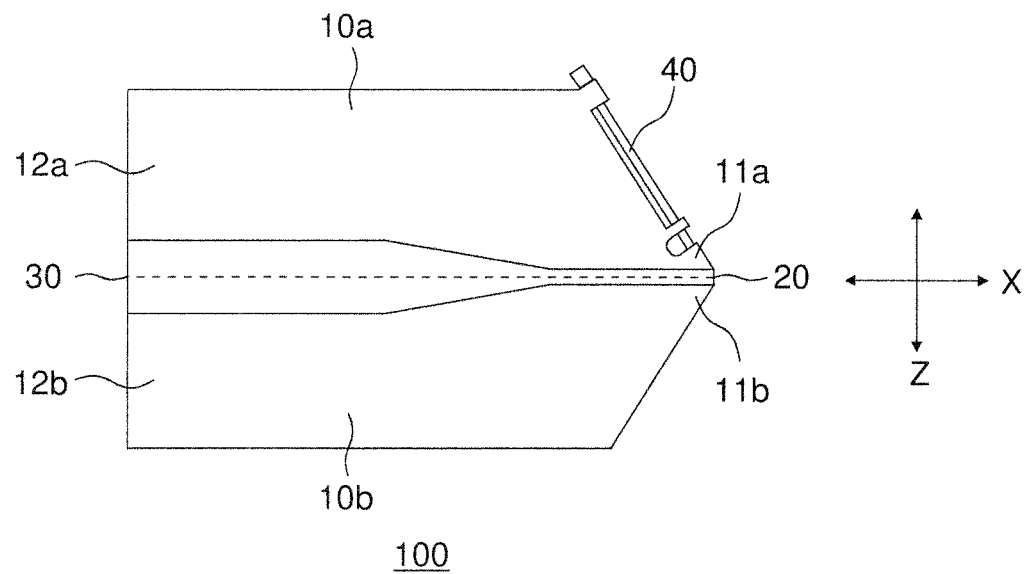
FIG. 1 is a schematic enlarged cross-sectional view of an extrusion molding die according to an embodiment of the present invention.

In recent years, various molding materials have often been molded in the form of a sheet. However, depending on the type of the molding material, the molding material may be difficult to be molded into the sheet shape even if the coat hanger die or the fishtail die is used as the die body, or a thickness of a sheet-shaped molded body may become non-uniform. For example, when a molding material containing ceramic particles is used, the coat hanger die results in a significantly decreased molding velocity on the edge side as compared with the center in the longitudinal direction of the slit port, so that it may not be possible to mold the molding material into the sheet shape. Further, although the fishtail die can mold the molding material into the sheet shape, it is difficult to obtain a sheet-shaped molded body having uniform thickness, because the width of the slit port in the short direction cannot be controlled. The disadvantages of the fishtail die would be solved by developing a fishtail die having a mechanism to control the width of the slit port in the short hand direction. However, the development of such a fishtail die is expensive, which would not be practical.

The present invention has been made to solve the above problems. An object of the present invention is to provide an extrusion molding die and an extrusion molding machine, which can mold a molding material into a sheet shape having a uniform thickness regardless of a type of molding material.

As a result of intensive studies for extrusion molding dies, the present inventors have found that the above problems can be solved by using a combination of a coat hanger die having a thickness adjustment mechanism with a fishtail die as a pair of die bodies, and have completed the present invention.

According to the present invention, it is possible to provide an extrusion molding die and an extrusion molding machine, which can mold a molding material into a sheet shape having a uniform thickness regardless of a type of molding material.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

An extrusion molding die according to an embodiment of the present invention (which may, hereinafter, be abbreviated as a "die") includes a pair of die bodies, the die bodies having: a pair of lip portions arranged so as to face each other to form a slit port; and a pair of introduction portions arranged so as to face each other to form an introduction port.

One of the pair of die bodies is a coat hanger die having a thickness adjustment mechanism, and the other of the die bodies is a fishtail die. By using such a combination of different die bodies, it is possible to acquire a function to be formed into a sheet shape by the fishtail die while utilizing the thickness adjustment function of the coat hanger die. Therefore, the molding material can be molded into a sheet shape having a uniform thickness regardless of the type of molding material.

The details of the extrusion molding die will be described below with the drawings.

FIG. 1 is a schematic enlarged cross-sectional view of an extrusion molding die according to an embodiment of the present invention.

As shown in FIG. 1, a die 100 is formed by combining a pair of die bodies 10a, 10b. The pair of die bodies 10a, 10b are generally joined together using bolts (not shown) or the like.

The die bodies 10a, 10b are provided with lip portions 11a, 11b, respectively, and the pair of lip portions 11a, 11b face each other to form a slit port 20 when the die bodies 10a, 10b are combined.

Further, the die bodies 10a, 10b are also provided with introduction portions 12a, 12b, respectively, and the pair of introduction portions 12a, 12b face each other to form an introduction port 30 when the die bodies 10a, 10b are combined.

The die body 10a is a coat hanger die having at least one thickness adjustment mechanism.

A shape or the like of the coat hunger die is not particularly limited as long as the coat hanger die has the thickness adjustment mechanism.

The thickness adjustment mechanism is not particularly limited, and it may employ any mechanism known in the art. For example, it is preferable that a plurality of thickness adjustment mechanisms are arranged side by side on the lip portion 11a in a longitudinal direction (direction Y) of the slit port 20, and are configured to be able to increase or decrease the width of the slit port 20 in the short direction (direction Z) by deforming at least a part of the lip portion 11a. More specifically, a plurality of adjustment bolts 40 are arranged on the lip portion 11a in lines in the longitudinal direction (direction Y) of the slit port 20, and the tightening of the adjustment bolts 40 can be controlled to deform at least a part of the lip portion 11a. By using the thickness adjustment mechanism having such a structure, the molding material can be molded into a sheet having a uniform thickness.

Figure 2:
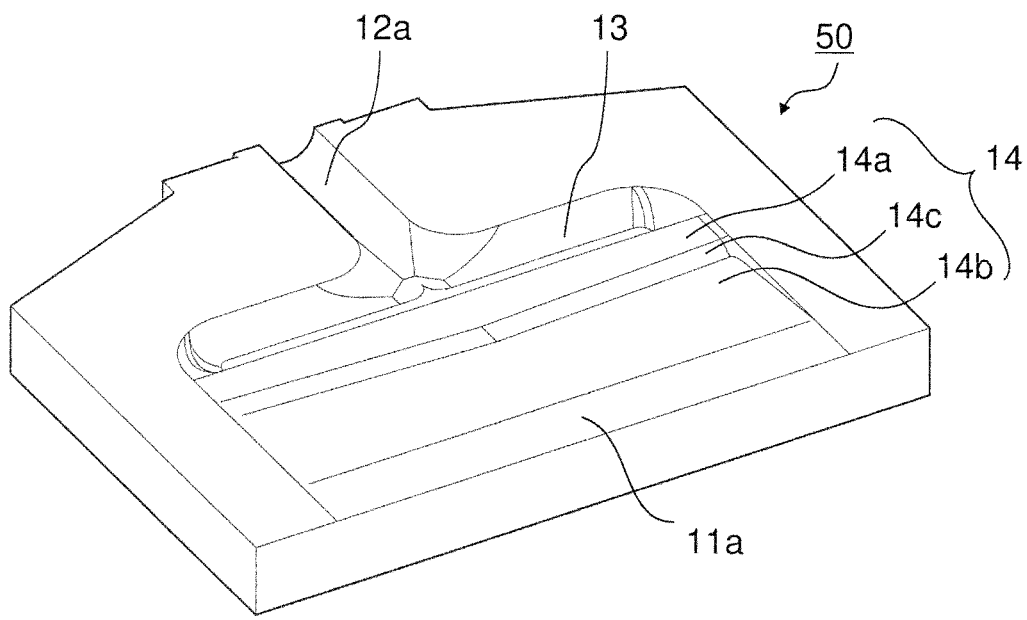
FIG. 2 is a schematic perspective view of a coat hanger die used for an extrusion molding die according to an embodiment of the present invention.

Here, FIG. 2 shows a schematic perspective view of a typical coat hanger die used in the extrusion molding die according to an embodiment of the present invention. In FIG. 2, the flow path side of the molding material is an upper surface, and the thickness adjusting mechanism is omitted. Further, FIG. 3 shows a schematic top view of the coat hanger die in FIG. 2.

Figure 3:
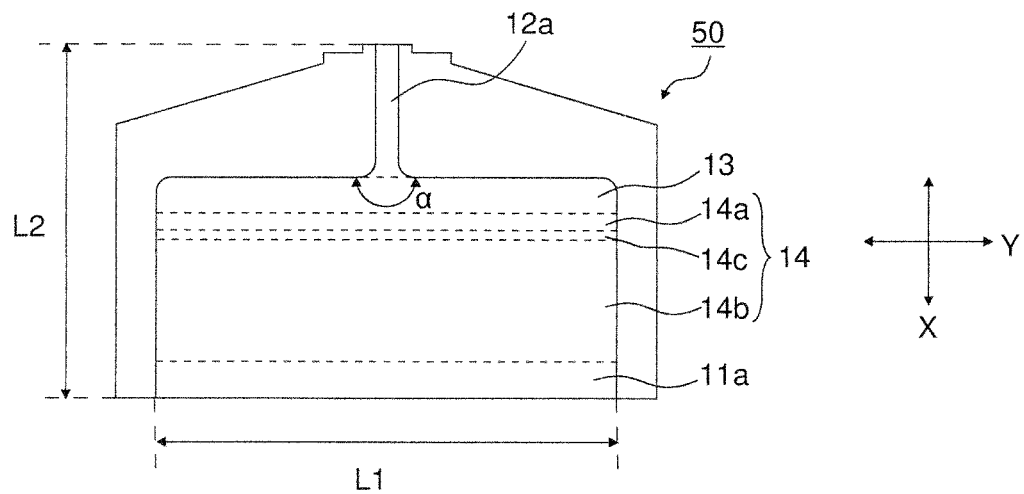
FIG. 3 is a schematic top view of the coat hanger die in FIG. 2.

As shown in FIGS. 2 and 3, the coat hanger die 50 as the die body 10a includes: a lip portion 11a; an introduction portion 12a; a manifold portion 13 formed between the introduction portion 12a and the lip portion 11a; and a land portion 14 formed between the manifold portion 13 and the lip portion 11a.

The coat hanger die 50 preferably has an opening angle a of the manifold portion 13 with respect to the introduction portion 12a of from 120 to 180°. By controlling the opening angle a at such an angle, the combination of the coat hanger die 50 with the fishtail die can stably decrease a velocity distribution of the molding material in the slit port 20 in the longitudinal direction (direction Y). Therefore, the molding material can be stably molded into a sheet shape corresponding to the slit port 20.

The opening angle a of the manifold portion 13 refers to an angle in a direction in which the manifold portion 13 expands with respect to the flow path direction (direction X) of the introduction portion 12a.

In the coat hanger die 50, the land portion 14 preferably includes a horizontal plane 14a, and inclined surfaces 14b, 14c. By controlling the land portion 14 to such a shape, the velocity distribution of the molding material in the slit port 20 in the longitudinal direction (direction Y) can be stably decreased when the coat hanger die 50 is used in combination with the fishtail die. Therefore, the molding material can be stably molded into the sheet shape corresponding to the slit port 20.

The die body 10b is a fishtail die.

The fishtail die is not limited, and various fishtail die having various shapes may be used.

Figure 4:
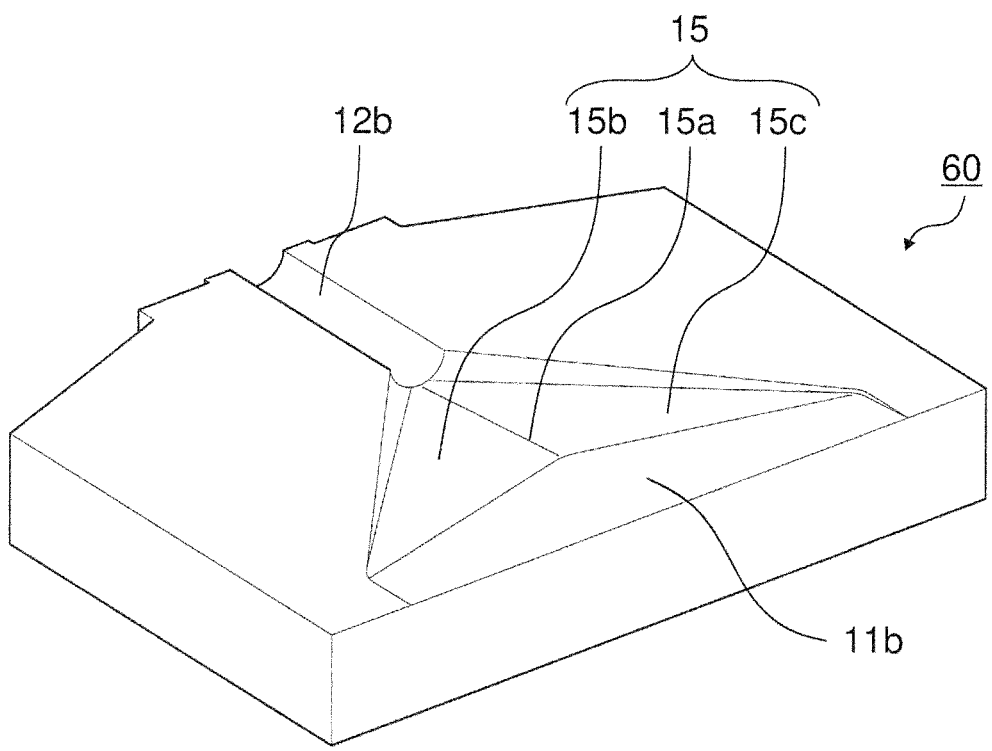
FIG. 4 is a schematic perspective view of a fishtail die used for an extrusion molding die according to an embodiment of the present invention.

Here, FIG. 4 shows a schematic view of a typical fishtail die used for the extrusion molding die according to the present invention. Also, FIG. 5 is a schematic top view of the fishtail die in FIG. 4.

Figure 5:
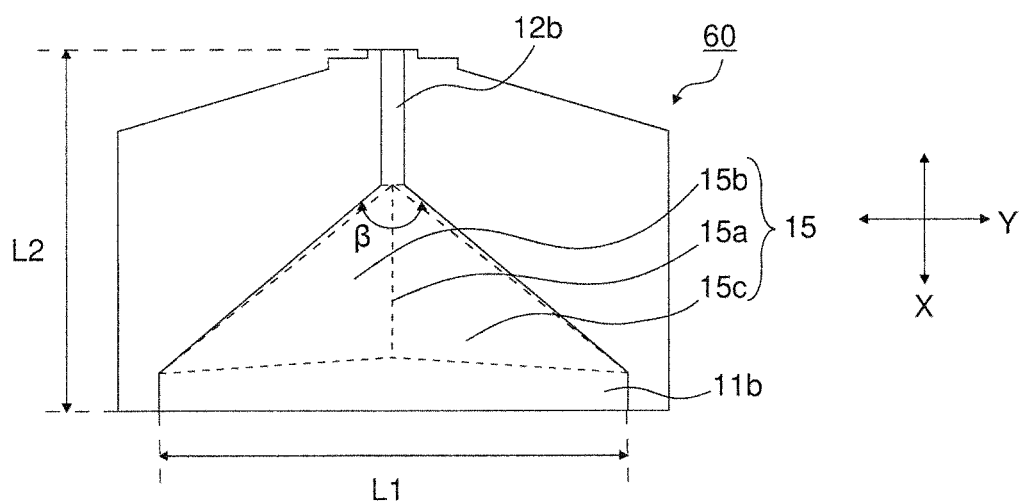
FIG. 5 is a schematic top view of the fishtail die in FIG. 4.

As shown in FIGS. 4 and 5, the fishtail die 60 as the die body 10b has a lip portion 11b, an introduction portion 12b, and an enlarged portion 15 formed between the introduction portion 12b and the lip portion 11b.

The introduction portion 12b of the fishtail die 60 preferably includes a portion having substantially the same shape as that of the introduction portion 12a of the coat hanger die 50. Such a shape can allow the molding material to be stably fed to the interior of the die 100.

As used herein, "a portion having substantially the same shape as the introduction portion 12a of the coat hanger die 50" means that the portion has substantially the same shape as a flow path shape (for example, a flow path width and a flow path depth) of the introduction portion 12a of the coat hanger die 50. Further, the expression "substantially the same shape" means that a difference between the shape and a reference shape is within ±5%.

The fishtail die 60 preferably has an opening angle β of the enlarged portion 15 with respect to the introduction portion 12b of from 30 to 120°. By controlling the opening angle β at such an angle, the combination of the fishtail die 60 with the coat hanger die 50 can stably decrease the velocity distribution of the molding material of the slit port 20 in the longitudinal direction (direction Y). Therefore, the molding material can be stably molded into a sheet shape corresponding to the slit port 20.

The opening angle β of the fishtail die 60 refers to an angle in a direction in which both ends of the expanded portion 15 expand with respect to the flow path direction (direction X) of the introduction portion 12b.

In the fishtail die 60, it is preferable that the enlarged portion 15 has a ridge line 15a extending from the introduction portion 12b to the lip portion 11b, and includes two inclined surfaces 15b, 15c separated by the ridge line 15a. By controlling the enlarged portion 15 in such a shape, the combination of the fishtail die 60 with the coat hanger die 50 can stably decrease the velocity distribution of the molding material in the slit port 20 in the longitudinal direction (direction Y). Therefore, the molding material can be stably molded into a sheet shape corresponding to the slit port 20.

It is preferable that the two inclined surfaces 15b, 15c have substantially the same area. Such a structure can allow the molding material to flow uniformly to both ends of the slit port 20 in the longitudinal direction (direction Y). Therefore, the molding material can be stably molded into a sheet shape corresponding to the slit port 20.

As used herein, the phrase "substantially the same area" means that a difference between the areas is within ±5%.

An inclination angle of the ridge line 15a is preferably from 1 to 75°. Such a structure can allow the molding material to be stably expanded in the longitudinal direction (direction Y) in the enlarged portion 15, so that the molding material can be stably molded into a sheet shape corresponding to the slit port 20.

As used herein, the "inclination angle of the ridge line 15a" means an angle of the ridge line 15a inclined in the direction Y when a position of the ridge line 15a in contact with the bottom of the introduction portion 12b is used as a reference of a horizontal plane.

Figure 6:
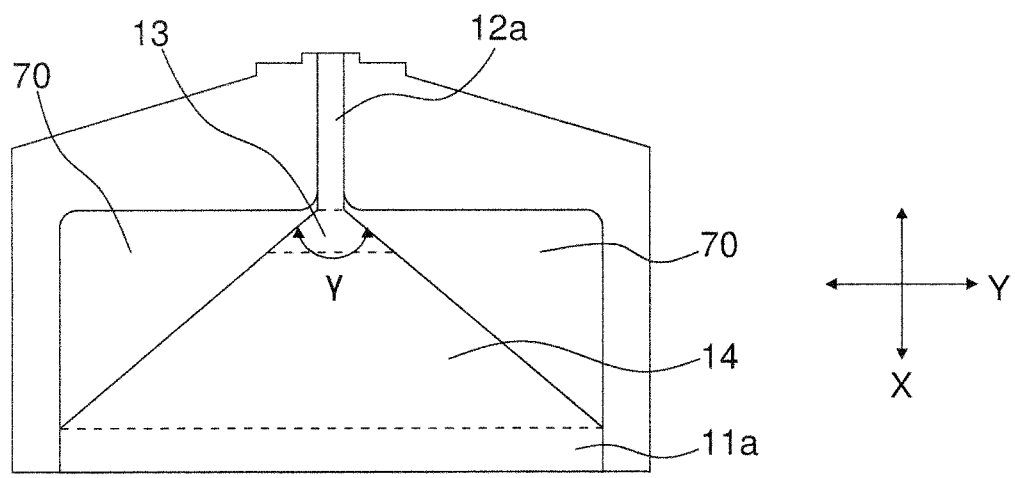
FIG. 6 is a schematic top view of a coat hanger die provided with a deckle portion.

The combination of the coat hanger die 50 with the fishtail die 60 may generate positions where the molding material is difficult to flow at both ends of the manifold portion 13 of the coat hanger die 50. Therefore, as shown in FIG. 6, the die 100 further includes a deckle portion 70 capable of regulating the flow path of the coat hanger die 50 so as to have an opening angle γ which is substantially the same as the enlarged portion 15 of the fishtail die 60. The provision of the deckle portion 70 can reduce the positions where the molding material is difficult to flow at both ends of the manifold portion 13 of the coat hanger die 50 when the coat hanger die 50 is combined with the fishtail die 60, so that it is easy to stably mold the molding material into a sheet shape corresponding to the slit port 20.

As used herein, the opening angle γ formed by the deckle portion 70 means an angle of the flow path side end faces of the pair of deckle portions 70 with respect to the flow path direction (direction X) of the introduction portion 12a.

The deckle portion 70 may be made of any material such as resins, although not particularly limited thereto.

The die 100 preferably has a ratio (L2/L1) of a length L2 from the introduction port 30 to the slit port 20 to a width L1 of the slit port 20 in the longitudinal direction (direction Y), of from 0.2 to 2.0. By controlling the ratio within such a range, the molding material can be stably molded into a sheet shape corresponding to the slit port 20.

The die 100 can be used for extrusion molding of various types of molding materials. In particular, even if the molding material has a lower viscosity, the die 100 can extrude it into a sheet. Therefore, the die 100 is preferably used for extrusion molding of a molding material containing ceramic particles, and more preferably used for extrusion molding of a molding material containing ceramic particles as a main component (ceramic molding material).

As used herein, the "main component" means that a percentage of the component relative to the total component is 50% by mass or more, and more preferably 60% by mass or more, and further preferably 70% by mass or more.

The viscosity (shear viscosity) of the molding material is preferably $1.0 \times 10^2$ Pa·s or more at a shear rate of 10 s$^{-1}$. It is difficult to mold the molding material having such a viscosity into a sheet when two coat hanger dies 50 are used in combination as a pair of die bodies 10a, 10b. Further, it is difficult to obtain a sheet-shaped molded body having a uniform thickness when two fishtail dies 60 are used in combination as a pair of die bodies 10a, 10b. Therefore, when the molding material having such a viscosity is used, it is particularly useful to use the die 100.

The viscosity of the molding material can be measured according to JIS K 7199: 1999.

Examples of the ceramic particles include, but not particularly limited to, particles formed of alumina, cordierite, silicon carbide, a silicon-silicon carbide composite material, mullite, aluminum titanate, or the like.

The molding material may optionally contain a dispersion medium, an organic binder, an inorganic binder, a pore former, a surfactant, and the like, in addition to the ceramic particles. These components are not particularly limited, and those known in the art may be used.

The die 100 can be installed and used in an extrusion molding machine.

The extrusion molding machine is not particularly limited as long as it has a structure capable of providing the die 100.

A typical extrusion molding machine includes an extrusion portion and a molding portion connected to the extrusion portion. The extrusion portion is not particularly limited as long as it has a function of extruding the molding material, and may optionally have a function of kneading the molding material.

The die 100 is arranged at one end of the molding portion, and the other end is connected to an extrusion port of the extrusion portion.

Since the extrusion molding machine having the above structure is provided with the die 100, it can be molded into a sheet having a uniform thickness regardless of the type of molding material.

EXAMPLES

Hereinafter, the present invention will be described in more detail with reference to Examples, but the present invention is not limited to these Examples.

(Preparation of Molding Material)

As a molding material, a ceramic molding material was used, which was obtained by mixing and kneading 100 parts by mass of alumina powder (ceramic particles), 10 parts by mass of methyl cellulose (organic binder) and 30 parts by mass of water (dispersion medium). A part of the molding material was colored into blue color using a colorant to evaluate the molding velocity.

The molding material had a viscosity of $1.5 \times 10^5$ Pa·s at a shear rate of 0.1 s$^{-1}$, a viscosity of $2.0 \times 10^4$ Pa·s at a shear rate of 1 s$^{-1}$, and a viscosity of $3.0 \times 10^3$ Pa·s at a shear rate of 10 s$^{-1}$.

The viscosity of the molding material was measured in accordance with JIS K 7199: 1999. A commercially available capillary rheometer was used for the measurement. The capillary tube had a diameter of from 1 to 2 mm and a length of from 25 to 50 mm.

Example 1

A die that combined a coat hanger die having a thickness adjustment mechanism with a fishtail die as a pair of die bodies was used to extrude the molding material as described above.

The coat hanger die used had the shape as shown in FIGS. 2 and 3 (a flow path width of the introduction portion of 19 mm, a flow path depth of the introduction portion of 9.5 mm, an opening angle α of the manifold portion of 180°). The fishtail die used had the shape as shown in FIGS. 4 and 5 (a flow path width of the introduction portion of 19 mm, a flow path depth of the introduction portion of 9.5 mm, an opening angle β of the enlarged portion of 80°, and an inclination angle of the ridge line of 10°). The width L1 of the slit port in the longitudinal direction (direction Y) was 200 mm, the length L2 from the introduction port to the slit port was 200 mm, and the width of the slit port in the short direction (direction Z) was 1.5 mm.

The extrusion molding was carried out by filling the above molding material into a cylinder with the die placed at one end and inserting a piston from the other end of the cylinder. In this case, the molding material was filled into the cylinder in such a way that layers of the colored molding material and layers of an uncolored molding material were alternately arranged every 5 mm. An insertion rate of the piston was 0.8 mm/s before feeding the molding material to the die and was 2.4 mm/s after feeding the molding material to the die.

For the extruded, sheet-shaped molded material, molding velocities of the sheet-shaped molded material in the width direction (at five positions) were measured using a velocity meter (FC-2000 from Keyence Corporation).

Comparative Example 1

Using a die that combined two coat hanger dies having no thickness adjustment mechanism as a pair of die bodies, extrusion molding was carried out in the same method as that of Example 1. Then, the molding velocities of the sheet-shaped molded material in the width direction (five positions) were measured in the same method as that of Example 1.

The two coat hanger dies have the same structure as the coat hanger die used in Example 1, with the exception that they do not have the thickness adjustment mechanism. The width L1 of the slit port in the longitudinal direction (direction Y) was 200 mm, the length L2 from the introduction port to the slit port was 200 mm, and the width of the slit port in the short direction (direction Z) was 1.5 mm.

Comparative Example 2

Using a die that combined a coat hanger die having a thickness adjustment mechanism with a coat hanger die having no thickness adjustment mechanism as a pair of die bodies, extrusion molding was carried out in the same method as that of Example 1. Then, the molding velocities of the sheet-shaped molded material in the width direction (five positions) were measured in the same method as that of Example 1.

The coat hanger die having the thickness adjustment mechanism used had the same structure as that of Example 1. The coat hanger die having no thickness adjustment mechanism used had the same structure as that of Comparative Example 1. The width L1 of the slit port in the longitudinal direction (direction Y) was 200 mm, the length L2 from the introduction port to the slit port was 200 mm, and the width of the slit port in the short direction (direction Z) was 1.5 mm.

Comparative Example 3

Using a die that combined two fishtail dies as a pair of die bodies, extrusion molding was carried out in the same method as that of Example 1. Then, the molding velocities of the sheet-shaped molded material in the width direction (five positions) were measured in the same method as that of Example 1.

Figure 7:
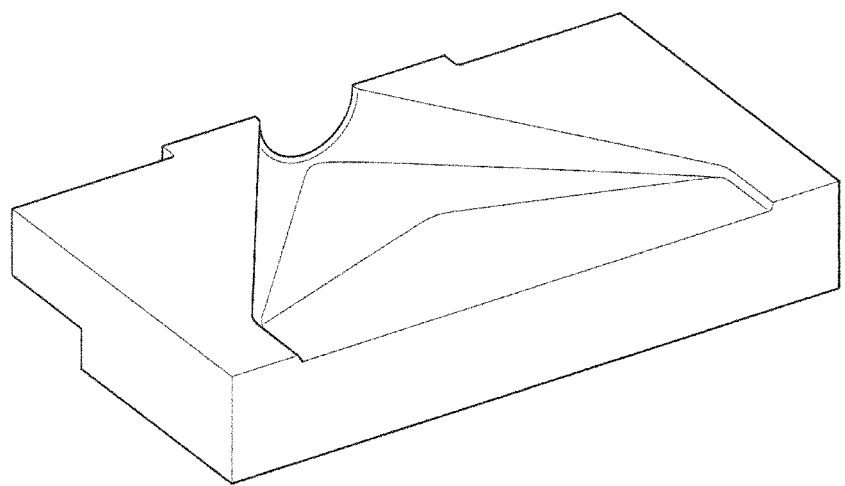
FIG. 7 is a schematic perspective view of a fishtail die used in Comparative Example 3.

The fishtail die used had the shape as shown in FIG. 7 (a width of the introduction port of 31 mm, a depth of the introduction port of 15.5 mm, an opening angle β of the enlarged portion of 60°, an inclination angle of the ridge line of 10°). The width L1 of the slit port in the longitudinal direction (direction Y) was 200 mm, the length L2 from the introduction port to the slit port was 200 mm, and the width of the slit port in the short direction (direction Z) was 1.5 mm.

Comparative Example 4

Using a die that combined a coat hanger die having no thickness adjustment mechanism with a fishtail die as a pair of die bodies, extrusion molding was carried out in the same method as that of Example 1. Then, the molding velocities of the sheet-shaped molded material in the width direction (five positions) were measured in the same method as that of Example 1.

The coat hanger die having no thickness adjustment mechanism used had the same structure as that of Comparative Example 1. The width L1 of the slit port in the longitudinal direction (direction Y) was 200 mm, the length L2 from the introduction port to the slit port was 200 mm, and the width of the slit port in the short direction (direction Z) was 1.5 mm.

The results of the molding velocities at the respective positions (five positions) in the width direction in Examples and Comparative Examples as described above are shown in FIG. 8.

Figure 8:
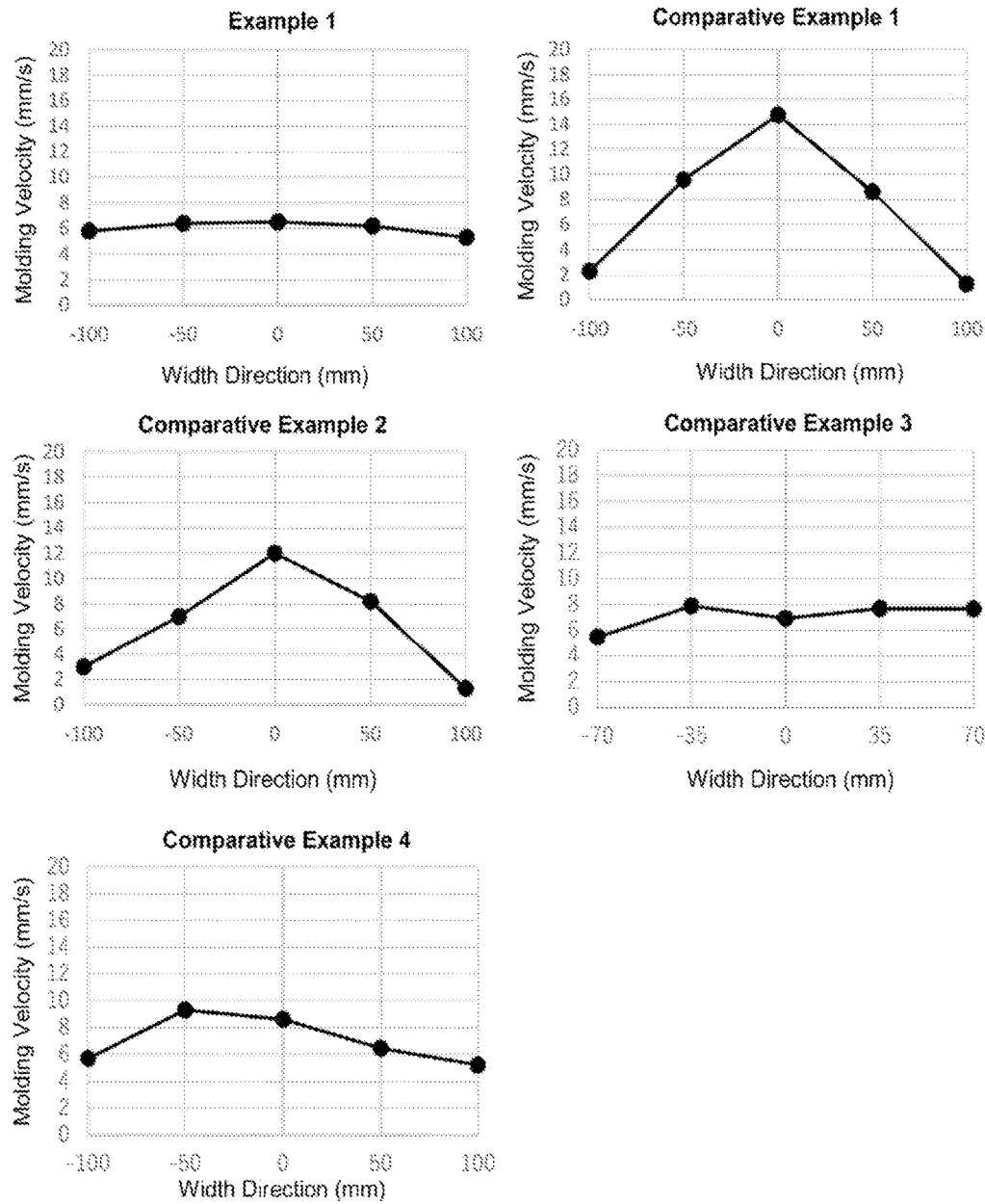
FIG. 8 is graphs each showing results of a molding velocity at each position in each width direction in Examples and Comparative Examples.

As shown in FIG. 8, in Example 1, a difference between the molding velocities at the five positions was up to 1 mm/s which was very small, and the molding material could be molded into a sheet having a uniform thickness.

In contrast, in Comparative Example 1, a difference between the molding velocities at five positions was up to 13 mm/s which was larger, and the molding material could not be molded into the sheet shape near the end portions in the width direction.

In Comparative Example 2, a difference between the molding velocities at the five positions was up to 11 mm/s which was larger, and the molding material could not be molded into the sheet shape near the end portions in the width direction.

In Comparative Example 3, a difference between the molding velocities at five positions was up to 2.5 mm/s which was smaller, but the thickness of the sheet-shaped molded material was non-uniform.

In Comparative Example 4, a difference between the molding velocities at the five positions was up to 4.0 mm/s which was smaller, but the thickness of the sheet-shaped molded body was non-uniform.

As can be seen from the above results, the present invention can provide an extrusion molding die and an extrusion machine that can be molded into a sheet shape having a uniform thickness regardless of the type of molding material.

DESCRIPTION OF REFERENCE NUMERALS

10*a*, 10*b* die body
11*a*, 11*b* lip portion
12*a*, 12*b* introduction portion
13 manifold portion 14 land portion
14a horizontal plane
14b, 14c inclined surface
15 expanded portion
15a ridge line
15b, 15c inclined surface
20 slit port
30 introduction port
40 adjustment bolt
50 coat hanger die
60 fishtail die
70 deckle portion
100 die

The invention claimed is:

1. An extrusion molding die comprising a pair of die bodies, the die bodies having: a pair of lip portions arranged so as to face each other to form a slit port; and a pair of introduction portions arranged so as to face each other to form an introduction port;
   wherein one of the die bodies is a coat hanger die having at least one thickness adjustment mechanism, and the other of the die bodies is a fishtail die;
   wherein the extrusion molding die has an internal space formed by an internal space of the coat hanger die and an internal space of the fishtail die, and the internal space of the coat hanger die is different from the internal space of the fishtail die;
   wherein the internal space of the coat hanger die comprises a manifold portion between an introduction portion of the pair of introduction portions and a lip portion of the pair of lip portions, and a land portion comprising a horizontal plane and an inclined surface between the manifold portion and the lip portion of the pair of lip portions; and
   wherein the internal space of the fishtail die comprises an enlarged portion between an introduction portion of the pair of introduction portions and a lip portion of the pair of lip portions, and the enlarged portion of the fishtail die has a ridge line extending from the introduction portion to the lip portion of the pair of lip portions, and two inclined surfaces separated by the ridge line.

2. The extrusion molding die according to claim 1, wherein the introduction portion of the fishtail die comprises a portion having substantially the same shape as that of the introduction portion of the coat hanger die.

3. The extrusion molding die according to claim 1, wherein an opening angle of the manifold portion of the coat hanger die with respect to the introduction portion of the coat hanger die is from 120 to 180°.

4. The extrusion molding die according claim 1, wherein an opening angle of the enlarged portion of the fishtail die with respect to the introduction portion of the fishtail die is from 30 to 120°.

5. The extrusion molding die according to claim 1, wherein the two inclined surfaces of the fishtail die have substantially the same area.

6. The extrusion molding die according to claim 1, wherein an inclination angle of the ridge line of the fishtail die is from 1 to 75°.

7. The extrusion molding die according to claim 4, further comprising a deckle portion capable of regulating a flow path of the coat hanger die so as to have an opening angle that is substantially the same as the opening angle of the enlarged portion of the fishtail die.

8. The extrusion molding die according to claim 1, wherein a ratio (L2/L1) of a length L2 from the introduction port to the slit port to a width L1 of the slit port in a longitudinal direction is from 0.2 to 2.0.

9. The extrusion molding die according to claim 1, wherein a plurality of thickness adjustment mechanisms are arranged side by side on the lip portion of the coat hanger die in a longitudinal direction of the slit port, and the thickness adjustment mechanisms are configured to be able to increase or decrease a width of the slit port in a thickness direction by deforming at least a part of the lip portion of the coat hanger die.

10. The extrusion molding die according to claim 1, wherein the extrusion molding die is used for extrusion molding of a molding material containing ceramic particles.

* * * * *